US007788397B1

(12) United States Patent
Schultz et al.

(10) Patent No.: US 7,788,397 B1
(45) Date of Patent: Aug. 31, 2010

(54) METHOD FOR MITIGATING ADVERSE PROCESSOR LOADING IN A PERSONAL COMPUTER IMPLEMENTATION OF A WIRELESS LOCAL AREA NETWORK ADAPTER

(76) Inventors: Richard Douglas Schultz, 4309 Ligustrum Dr., Melbourne, FL (US) 32934; George Rodney Nelson, Jr., 207 Sykes Loop Dr., Merritt Island, FL (US) 32953; John Erich Hoffmann, 516 Latania Palm Dr., Indialantic, FL (US) 32903

( * ) Notice: Subject to any disclaimer, the term of this patent is extended or adjusted under 35 U.S.C. 154(b) by 1333 days.

(21) Appl. No.: 10/625,799

(22) Filed: Jul. 23, 2003

Related U.S. Application Data

(60) Provisional application No. 60/397,912, filed on Jul. 23, 2002.

(51) Int. Cl.
*G06F 15/16* (2006.01)
*G08C 17/00* (2006.01)
*H04B 1/38* (2006.01)
(52) U.S. Cl. ................... 709/233; 709/235; 370/311; 455/574
(58) Field of Classification Search .......... 709/233, 709/235; 370/311; 455/574
See application file for complete search history.

(56) References Cited

U.S. PATENT DOCUMENTS

| 6,118,834 | A * | 9/2000 | Rasanen ............... 375/372 |
| 6,430,161 | B2 * | 8/2002 | Uemura et al. ........... 709/232 |
| 6,434,513 | B1 * | 8/2002 | Sherman et al. ........... 709/223 |
| 6,490,271 | B1 * | 12/2002 | Erjanne ............... 370/347 |
| 6,577,871 | B1 * | 6/2003 | Budka et al. ........... 455/453 |
| 6,917,598 | B1 * | 7/2005 | Emeott et al. ............ 370/311 |
| 7,126,945 | B2 * | 10/2006 | Beach ................. 370/389 |
| 7,324,543 | B2 * | 1/2008 | Wassew et al. ........... 370/437 |
| 2008/0019277 | A1 | 1/2008 | Schultz |

OTHER PUBLICATIONS

U.S. Appl. No. 10/428,618, filed May 2, 2003.
U.S. Appl. No. 10/460,684, filed Jun. 12, 2003.
U.S. Appl. No. 10/458,127, filed Jun. 10, 2003.

* cited by examiner

*Primary Examiner*—Kevin Bates
(74) *Attorney, Agent, or Firm*—McDonnell Boehnen Hulbert & Berghoff LLP

(57) ABSTRACT

A personal computer's (PC) microprocessor is used to provide both the physical layer (PHY) and media access control (MAC) processing functions required to implement a wireless local area network (WLAN) adapter. This technique uses the polling mechanism associated with the power save (PS) functionality of WLAN protocol to relieve networking stress on the host processing system. It does this while maintaining networking integrity and packet delivery. The WLAN protocol polling mechanism is used to briefly inhibit the transfer of packets from the WLAN access point (AP) during peak periods of network traffic and/or host processor loading. Because the modulation, demodulation, and MAC functions, typically implemented in dedicated hardware on existing adapters are implemented in software running on the host PC microprocessor, other host system processes and applications can interfere with these time critical functions. Conversely, latency introduced by WLAN specific processing tasks during peak periods of network traffic may cause unacceptable delays to the other processes and applications requiring microprocessor attention. In addition to its primary stated purpose of allowing WLAN mobile stations to save power, this technique will use power save polling as a method for controlling delivery of network packets when the host is heavily loaded or when peak interrupt latencies make reliable packet delivery difficult or impossible.

18 Claims, 3 Drawing Sheets

WLAN Adapter and Host CPU Locations for the Program to Report Processor Loading Indications

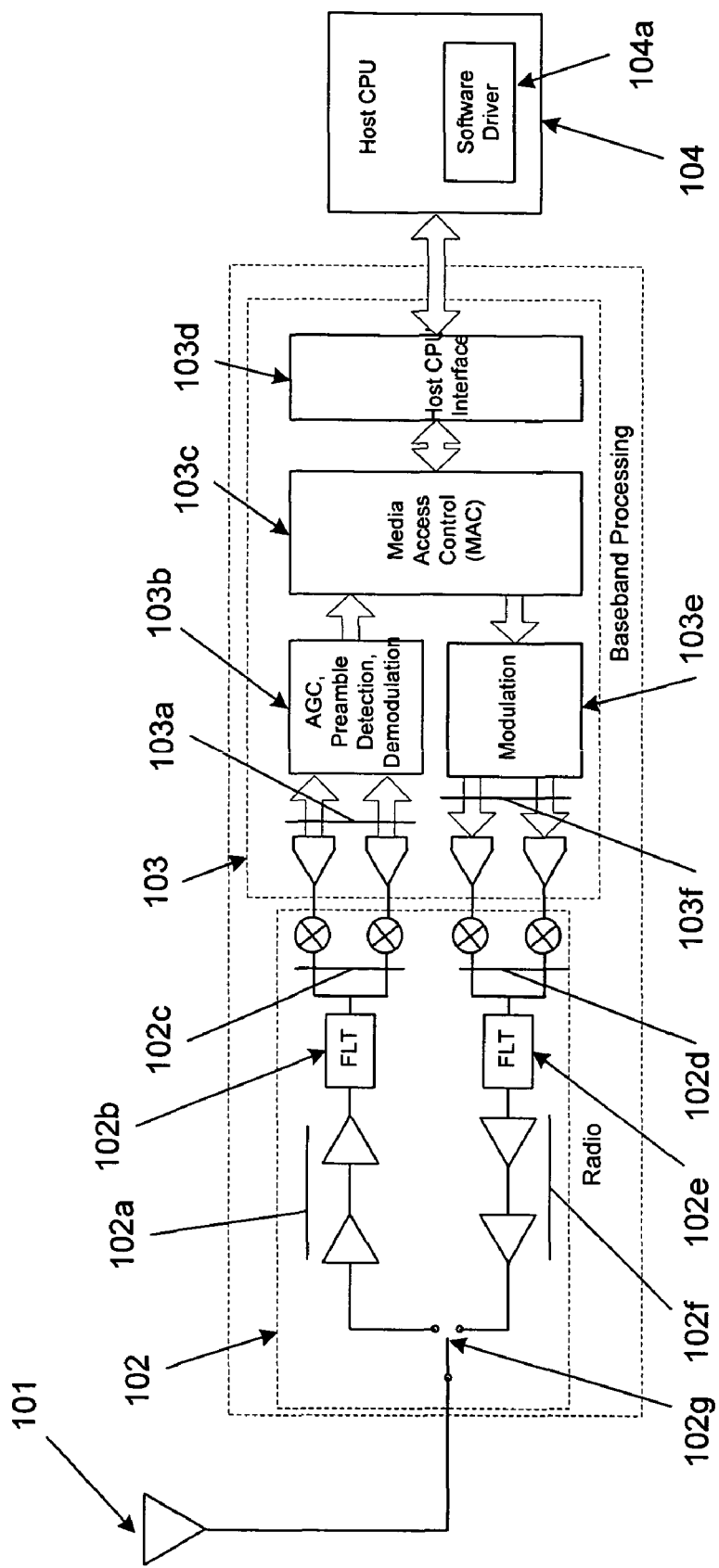
Prior Art WLAN Adapter
Figure 1.0

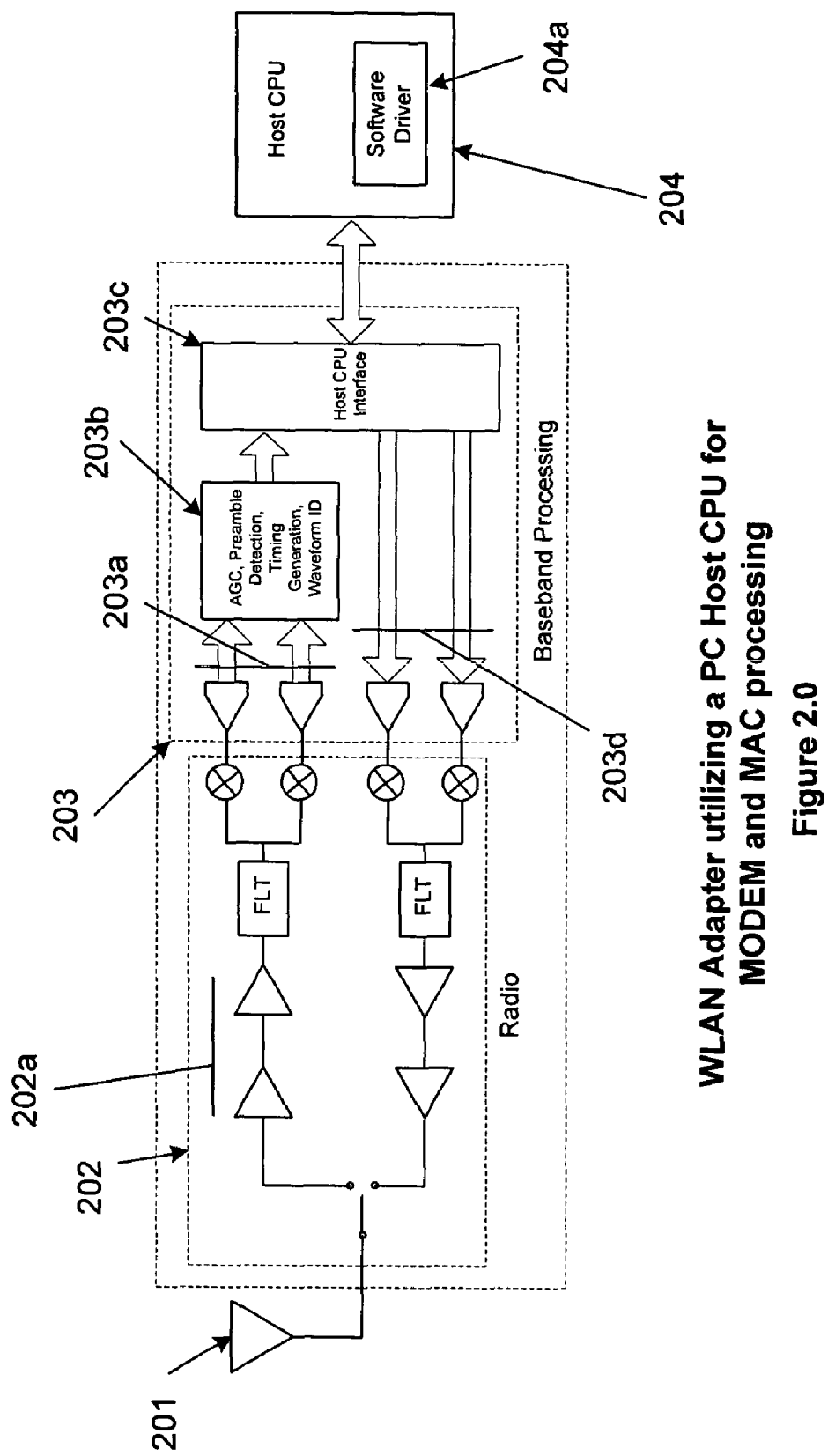
WLAN Adapter utilizing a PC Host CPU for MODEM and MAC processing
Figure 2.0

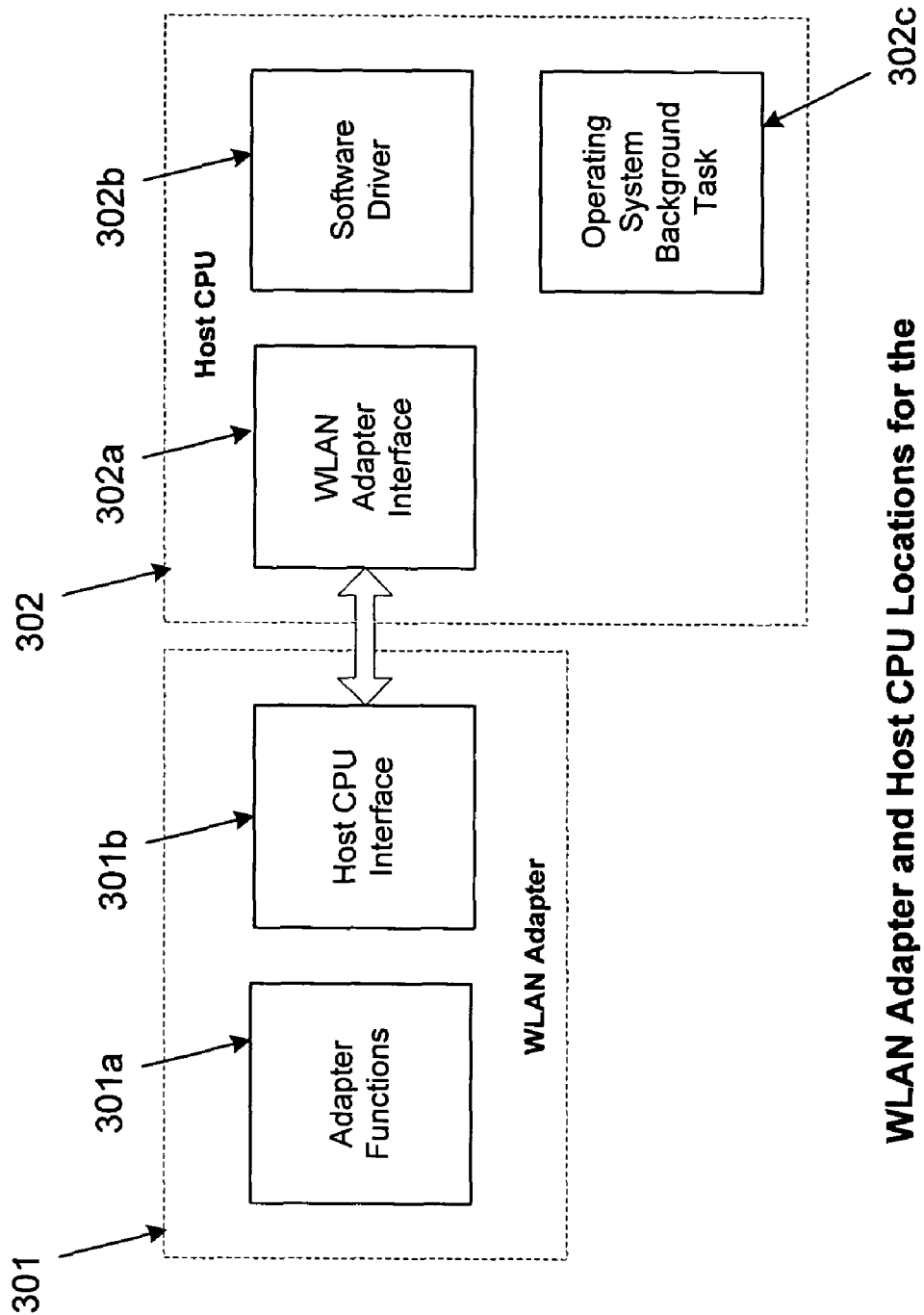
Figure 3.0
WLAN Adapter and Host CPU Locations for the Program to Report Processor Loading Indications

METHOD FOR MITIGATING ADVERSE PROCESSOR LOADING IN A PERSONAL COMPUTER IMPLEMENTATION OF A WIRELESS LOCAL AREA NETWORK ADAPTER

This application claims the benefit of U.S. Provisional Application No. 60/397,912 filed Jul. 23, 2002. This invention relates to electronic communications systems and more particularly to a system for enabling a computer to transmit and receive information over a packet based wireless communications link.

BACKGROUND OF THE INVENTION

The host microprocessor of personal computers (PC) has been used to provide the signal processing functions required to implement wire line analog communications functions for some time. The modulator demodulator (MODEM) functions required to implement existing wire line standards were historically implemented in software running on dedicated signal processors on the modem hardware. With the advent of more and more powerful personal computers it became possible to implement much of the processing software on the host processor within the PC. Using the host processor instead of dedicated signal processors greatly reduces the cost of the MODEM hardware. If the host processor is powerful enough, the impact on other application running on the host is relatively small when MODEM processing is performed.

The advent of small low cost radios and small portable notebook computers has spurred the recent growth of wireless local area networks (WLAN). These networks are high bandwidth (>1 Mb/s) half duplex packet networks, which contrast with the wire line networks, which are relatively low bandwidth (<56 kb/s), full duplex, and circuit switched. The same cost savings gained in the wire line network adapters by moving the MODEM functions from dedicated hardware to the PC host processor is theoretically possible with WLAN adapters. However, the bit rates and thus the amount of processing required for WLAN adapters is much higher than that of the wire line adapters. On the surface it would appear that the processing required by the WLAN adapter would make the load on the PC host microprocessor prohibitive.

There are several features of the WLAN waveforms and protocol which can be exploited to allow the host processor in a PC to perform the MODEM functions without significant impact to other applications running on the host processor. First, the WLAN protocol is half duplex, which dictates the host processor is never required to process both transmit and receive waveforms simultaneously. Second, the WLAN protocol is packet based, which means the host processor is not required to process data in a continuous fashion. Third, since the protocol is packet based, every packet is preceded by a preamble. The preambles can be used to trigger the host processor to perform MODEM processing only when valid packets arrive at the receiver.

The WLAN protocol allows mobile stations to notify an access point (AP) that the mobile station (MS) is entering a lower power state. This low power or Power Save (PS) state transmitted by the mobile station is assumed by the AP to prevent packet reception. Therefore, the AP buffers any frames intended for a mobile station in PS state until such time as the mobile station "asks" for individual frames through a polling mechanism or the mobile station returns to the non-PS state. Since a software driver running on the host processor may be adversely affected during times of peak loading, it will benefit from the more regulated behavior of a WLAN mobile station and AP operating in PS mode. While in the PS state, all frames intended for a PS mobile station will be buffered at the AP until the mobile station retrieves them through a PS-Poll message. Normally, this is intended to allow the mobile station to power down the receiver. However, the mechanisms used in this technique (PS mode) will allow a mobile station, whose host processor loading becomes excessive, to defer packet reception until such time as the processor becomes available again.

SUMMARY OF THE INVENTION

A primary objective of the present invention is to provide a technique for enabling a personal computer to transmit and receive information over a packet based wireless communications link at very low cost by using the personal computers central processing unit (CPU) to perform most of the communications link processing.

A secondary objective is to use the polling mechanism associated with the power save functionality in the WLAN protocol to control delivery of network packets, when the host CPU is heavily loaded or when interrupt latencies make reliable packet delivery difficult or impossible, in such a way as to minimize the processing load on the host CPU so that it can be used simultaneously for both wireless packet data and other desktop applications.

The present invention utilizes the mechanisms of the WLAN PS mode of operation to defer packet reception until processor loading decreases. When a mobile station notifies an AP that the mobile station wishes to enter the PS mode of operation, the AP is obligated to defer transmission of all packets destined for the mobile station. The AP buffers frames intended for a mobile station in PS mode until the mobile station notifies the AP that it is no longer in PS mode or until the mobile station requests individual packets via a PS-Poll packet. By taking advantage of this mechanism, a mobile station will be able to defer all packet transmission and reception until it is able to sense that the processor is no longer in a peak loading condition.

BRIEF DESCRIPTION OF THE DRAWINGS

FIG. 1.0 is a top level block diagram of a prior art WLAN adapter.

FIG. 2.0 is a block-schematic diagram of a WLAN adapter which relies on the central processor unit (CPU) of a personal computer (PC) to perform MODEM and MAC functions.

FIG. 3.0 is a diagram of the WLAN adapter and Host CPU locations for the program to report processor loading indications.

DETAILED DESCRIPTION

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Wireless Local Area Networks (WLAN), such as that standardized by the Institute of Electrical and Electronics Engineers (IEEE) 802.11, were designed to provide un-tethered access to information sources such as the Internet and enterprise file systems. The WLAN allows standard Internet protocol (IP) traffic to be transmitted using radio frequencies (RF) eliminating the need for a hardwired Ethernet connection common on wired local area networks (LAN). Just as in wired networks, the physical interface to the network is implemented on what is known as a network adapter or just adapter. In prior art, the WLAN service was provided to the applications (file managers, Internet browsers, etc.) running on a computers host CPU via four components.

The first component is a software device driver allowing the application on the host CPU to access the WLAN service through a common interface such as a transmission control protocol (TCP) stack. The software driver provides the interface between the TCP stack and the MAC functions, which are specific to the WLAN.

The MAC function provides the support protocol required to transport the IP traffic or packets over the wireless medium. The MAC provides data rate and error control as well as congestion management. The MAC also provides the interface between the software driver and the physical layer MODEM functions. In prior art the MAC function was implemented on a dedicated processor located on the WLAN adapter.

The MODEM provides the mapping of the payload data (IP packets) and control data to a form more conducive to wireless transmission and reception. The modulation functions in prior art would include scrambling, interleaving, puncturing, encoding, mapping, and filtering of bits onto the channel. The demodulation functions in prior art would include filtering, de-mapping of bits from the channel, decoding, de-interleaving and de-scrambling. In prior art the MODEM functions were provided via dedicated hardware on the WLAN adapter.

The final function required for implementation of a WLAN adapter is the radio. The radio is used to translate the base-band waveform generated and used by the MODEM up and down to RF frequencies. In prior art the radio functions were provided via dedicated hardware on the WLAN adapter.

FIG. 1.0 outlines the major components of prior art WLAN adapters.

The four components are the software driver (104a) running on the host CPU (104), MAC functions (103c), MODEM functions (103b, 103e), and radio (102). The software driver (104a) communicates with the MAC (103c) through an interface (103d). This interface is normally a standardized bus type such as peripheral component interface (PCI), PC Card etc. The MAC receives data from the wireless medium via demodulation functions (103b) and provides data to the wireless medium via the modulator functions (103e). The MODEM functions (103b, 103e), MAC functions (103c), and CPU interface functions (103d) constitute the base-band processing functions (103). The base-band processing utilizes analog to digital converters (ADCs) (103a) to interface with the receive portion of the radio (102). The base-band utilizes digital to analog converters (DACs) (103f) to interface with the transmit portion of the radio (102). The radio consists of two sections, the transmitter (102d, 102e, 102f) and the receiver (102a, 102b, 102c). The radio transmitter receives the analog signal from the base-band processing (103) in a complex format and translates the analog signals to RF using two mixers (102d). The result of the mixing operation is then filtered (102e) and amplified (102f). The transmit/receive (T/R) switch (102g) then connects the amplifiers (102f) to the antenna (101). In receive mode the T/R switch (102g) connects the antenna (101) to the receive amplifiers (102a). The result of the amplification is then filtered (102b) and down converted to complex base-band analog via two mixers (102c). The analog outputs of the mixers are presented to ADCs (103a) for processing by the demodulation functions (103b).

FIG. 2.0 outlines a WLAN adapter, which uses the host CPU to perform both MAC and MODEM functions. The details of implementing a WLAN adapter using a host CPU to provide both MAC and MODEM functions is more specifically described in U.S. Utility patent application Ser. No. 10/428,618 filed May 2, 2003 and that application is hereby incorporated by reference. The radio functions (202) and antenna (201) are identical to that of prior art (FIG. 1.0). However, the MAC functions of prior art are now implemented in the host CPU software driver (204) and no longer exist in the base-band functions (203). In addition, most of the MODEM functions have been implemented in the host CPU software driver (204). The MODEM functions that remain (203b) on the adapter have been specialized to require host CPU processing only when valid packets arrive at the receiver or when the wireless medium is available for transmission. The host CPU interface (203c) has also been modified to allow the host CPU (204) direct access to various functions previously controlled by the MODEM functions that now reside on the host.

The remaining MODEM functions (203b) on the WLAN adapter are automatic gain control (AGC), preamble detection, timing generation, and waveform identification. The AGC function provides control over the receive amplifiers (202a) to maintain the correct analog signal level into the ADCs (203a). Since this function requires near continuous supervision it must remain an autonomous function of the WLAN adapter. The preamble detection function serves two purposes in prior art WLAN adapters. First, the preamble detector is used to start demodulation processing. Second, the preamble detector is used by the transmitter to sense the availability of the wireless access medium. If the preamble detection function does not detect a valid preamble there is no need to perform demodulation processing. Similarly, if valid preambles are being detected there is no need to perform transmit processing since the wireless medium is being used. This fact allows the host CPU to run autonomously from the WLAN adapter unless valid preambles are being detected indicating that there are data packets arriving at the receiver. The waveform identification function works in conjunction with the preamble detection to filter out packets that are not of interest to this adapter based on data rate, modulation type etc. Details of the use of waveform identification to minimize processor loading can be found in U.S. Utility patent application Ser. No. 10/460,684 filed Jun. 12, 2003 and that application is hereby incorporated by reference. Once the preamble detection function detects valid packets, which require demodulation and MAC processing, the host CPU can be interrupted to provide the necessary processing.

One issue with interrupting the host CPU to process is the latency between the assertion of the interrupt and the start of CPU processing. Due to the time critical nature of the WLAN protocol any delay in the start of MODEM processing due to the non-deterministic nature of the personal computer operating system may cause packets to be missed. One technique for mitigating the latency is to use power save mode to allow packets to flow to the adapter only after control of the host CPU has been obtained. Details of this use of power save mode can be found in U.S. Utility patent application Ser. No. 10/458,127 filed Jun. 10, 2003 and that application is hereby incorporated by reference.

It is desirable to limit the impact to other desktop applications running on a host CPU when MODEM functions are performed in parallel. Instead of using power save (PS) mode to protect a device that might be running low on battery power, or as outlined in U.S. Utility patent application Ser. No. 10/428,127 to mitigate interrupt latency, it can be used to better regulate the flow of packets when the host CPU is not in a favorable state from a loading standpoint. Various host CPU loading estimation and measurement methods are described that can determine when and if the power save mode of the protocol should be enabled. These same methods will be used to determine when to disable the power save mode and return to normal protocol operational mode. Loading indications could come from the WLAN adapter, the software driver or a background task running on the host CPU. What follows is the current invention for determining the loading conditions and interrupt behavior of the host CPU.

FIG. 3.0 is a diagram of the WLAN adapter and host CPU locations for the program to report processor loading indications. The WLAN adapter (301) performs a number of operations (301a) in support of the baseband processing done on the host CPU (302). The results of these operations are communicated by the host CPU interface (301b) on the WLAN adapter (301). The host CPU (302) accepts this information via it's own WLAN adapter interface (302a). The software driver (302b) performs both the MAC and MODEM functions. The software driver (302b) can also accept additional processor loading information from an operating system background task (302c). The software driver (302b) is also capable of measuring processor loading based on its own interactions with the host CPU operating system.

During normal operation, a host CPU (302) will fluctuate between relatively long idle times and no idle time. During times when the host CPU (302) is heavily loaded, the WLAN PS mode provides a mechanism for the software driver (302b) to be able to defer both packet transmission and packet reception until the host CPU (302) is not as heavily loaded. Certain variations of the protocol provide a bit in the packet header that indicates network loading conditions. The software driver can decode this bit to gain an indication of the network activity level. That same bit would be encoded at the mobile station to indicate the loading or backlog of information at its end.

Indications from the WLAN adapter (301) on the rate of reception of candidate packets or other network loading conditions can be reported to the software driver (302b). As well, only the WLAN adapter (301) knows metrics about the number of attempts and response time of the host CPU (302) as it relates to interrupts to transfer information intended for the software driver.

An application residing as a background process (302c) on the host CPU (302) can monitor its own loading conditions. The program (302c) can be designed to provide the software driver (302b) with a report of the host CPU (302) loading conditions. The program may establish thresholds of activity which will trigger notification of adverse loading conditions to the software driver (302b). It may either do this directly through normal programming messaging techniques, or through a timed response pattern. This timed response pattern could provide the software driver (302b) with a regular time "tick" from the application (302c)—an indication that normally occurs at regular intervals when the host CPU (302) is not heavily loaded. During times of peak host CPU (302) loading, the "tick" would not be as frequent or as regular, so the software driver (302b) would then be able to surmise that a peak loading condition exists.

As well, the software driver (302b) can measure the response time of the host CPU (302) to its requests for processor time. Response time and the time permitted to use, as well as the interrupt rate from the WLAN adapter (301) can allow the software driver (302b) to determine that it cannot process all incoming samples given the existing processor load. If a new interrupt arrives indicating the need to process more samples from the WLAN adapter (301) before the software driver (302b) is completed with the previous set, the driver can determine it is not getting enough CPU resources to maintain real time processing. The amount of time required per host CPU (302) interrupt should be compatible with the number of samples recently ingested from the WLAN adapter (301). If the software driver (302b) has not completed the current segment before losing host CPU (302) processing resources, it can determine it is not able to maintain real time processing.

The methods for determining host CPU (302) loading in this technique shall include, but not be limited to, those outlined above. Additionally, the algorithm may include elements and/or any combination of elements from each of the methodologies for determining adverse host CPU loading conditions as outlined above.

Regardless of how the software driver (302b) is notified, the effect is the same. The software driver (302b) will immediately notify the AP that it is in PS mode. It does this by setting the PS bit set in the Frame Control word that resides in the MAC header of any allowed frame type in the given protocol context. When the mobile station sends a packet with the PS bit set and the AP acknowledges reception of the frame, then all frames that are destined for the mobile station will be buffered by the AP until the mobile station signals that it has returned from power save mode.

This condition persists until either the mobile station indicates to the AP that it is no longer in PS mode or if the mobile station retrieves frames from the AP via polling. A mobile station notifies the AP that it is no longer in PS mode by clearing the PS bit in the Frame Control word of the MAC Header of any frame type allowed in the given protocol context.

Additionally, a mobile station in PS mode may retrieve individual frames buffered at the AP by sending a PS-Poll frame with the PS bit set in the Frame Control word of the MAC Header to the AP. Each PS-Poll received by the AP with the PS bit set in the Frame Control word of the MAC Header signals the AP to send only one of the buffered frames intended for reception by the mobile station.

Thus, the mobile station in PS mode is in full control of packet transfer. Instead of regulating packet transfer solely to save power as implied by the original intent of the protocol and the language of the standard, this technique uniquely identifies this methodology for mitigating the effect of host CPU (302) loading on a software driver (302b) with time critical processing components used in the modulating, demodulating and control of a WLAN system.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

The invention claimed is:

1. A method for reducing central processing unit (CPU) loading, the method comprising:
    measuring a current CPU load by measuring an interrupt latency;
    determining that the current CPU load exceeds a predetermined threshold;
    responsive to determining that the current CPU load exceeded the predetermined threshold, entering a power save mode by setting a Power Save (PS) bit in a frame control word, thereby signaling a communications system transmitter to inhibit packet transmission and packet reception;

monitoring CPU load while the communication system transmitter is inhibited;

determining that the monitored CPU load is below the predetermined threshold; and responsive to determining that the monitored CPU load is below the predetermined threshold, signaling the communications system transmitter to begin transmitting packets, wherein the signaling clears the PS bit.

2. The method of claim 1, wherein monitoring the CPU load is performed by an operating system background task.

3. The method of claim 1, further comprising signaling the communication system transmitter to transmit a frame during the power save mode.

4. The method of claim 1, in which the communications system is wireless.

5. The method of claim 1, in which the communications system is IEEE 802.11 wireless local area network (WLAN).

6. The method of claim 1, in which the communication system is Bluetooth.

7. The method of claim 1, in which the communications system is IEEE 802.15 wireless personal area network (PAN).

8. An apparatus, comprising:

a processor configured with digital logic configured to:

measure a current central processor unit (CPU) load by measuring the response time of the CPU to a request for processor time;

determine that the current CPU load exceeds a predetermined threshold;

responsive to determining that the current CPU load exceeded the predetermined threshold, enter a power save mode by setting a Power Save (PS) bit in a frame control word, thereby signaling a communications system transmitter to inhibit packet transmission and packet reception;

monitor CPU load while the communication system transmitter is inhibited;

determine that the monitored CPU load is below the predetermined threshold; and responsive to determining that the monitored CPU load is below the predetermined threshold, signal the communications system transmitter to begin transmitting packets, wherein the signaling clears the PS bit.

9. The apparatus of claim 8, wherein monitoring the CPU load is performed by a background task.

10. The apparatus of claim 8, wherein the current CPU load measurement is based on the response time of a host CPU to a request for interrupt.

11. The apparatus of claim 8, wherein the processor is further configured to signal the communications system transmitter to transmit a frame during the power save mode.

12. The apparatus of claim 8, wherein the communications system is wireless.

13. The apparatus of claim 8, wherein the communications system is at least one of: an IEEE 802.11 wireless local area network (WLAN); a Bluetooth system; and an IEEE 802.15 wireless personal area network (PAN).

14. A system, comprising:

means for measuring a current central processor unit (CPU) load by measuring an interrupt latency;

means for determining that the current CPU load exceeds a predetermined threshold;

means for, responsive to determining that the current CPU load exceeded the predetermined threshold, entering a power save mode by setting a Power Save (PS) bit in a frame control word, thereby signaling a communications system transmitter to inhibit packet transmission and packet reception;

means for monitoring the CPU load while the communication system transmitter is inhibited;

means for determining that the monitored CPU load is below the predetermined threshold; and means for, responsive to determining that the monitored CPU load is below the predetermined threshold, signaling the communications system transmitter to begin transmitting packets, wherein the signaling clears the PS bit.

15. The system of claim 14, wherein the monitoring the CPU load is performed by a background task.

16. The system of claim 14, further comprising means for signaling the communications system transmitter to transmit a frame during the power save mode.

17. The system of claim 14, wherein the communications system is wireless.

18. The system of claim 14, wherein the communications system is at least one of: an IEEE 802.11 wireless local area network (WLAN); a Bluetooth system; and an IEEE 802.15 wireless personal area network (PAN).

* * * * *